United States Patent
Matsuzaki et al.

(10) Patent No.: US 6,937,008 B2
(45) Date of Patent: Aug. 30, 2005

(54) ROTATING ANGLE DETECTOR AND APPARATUS THEREOF FOR DETECTING THE ROTATING POSITION OF A ROTOR

(75) Inventors: Kazunari Matsuzaki, Fukuoka (JP); Takashi Nagase, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/640,628

(22) Filed: Aug. 14, 2003

(65) Prior Publication Data

US 2004/0150391 A1 Aug. 5, 2004

Related U.S. Application Data

(63) Continuation of application No. PCT/JP02/01167, filed on Feb. 12, 2002.

(30) Foreign Application Priority Data

Feb. 14, 2001 (JP) ........................................ 2001-036259

(51) Int. Cl.⁷ ................................................ G01B 7/30
(52) U.S. Cl. ................................ 324/207.2; 324/207.25
(58) Field of Search ...................... 324/207.19, 207.2, 324/207.21, 207.25, 207.26, 251; 338/32 R, 32 H

(56) References Cited

U.S. PATENT DOCUMENTS

| | | | | |
|---|---|---|---|---|
| 2,536,805 A | * | 1/1951 | Hansen, Jr. ................. | 324/253 |
| 3,146,318 A | * | 8/1964 | Kuhrt et al. .................. | 360/84 |
| 4,283,664 A | * | 8/1981 | Ebert .......................... | 318/138 |
| 4,737,710 A | * | 4/1988 | Van Antwerp et al. .. | 324/207.2 |
| 4,982,155 A | * | 1/1991 | Ramsden .................. | 324/207.2 |
| 5,045,920 A | * | 9/1991 | Vig et al. .................... | 257/414 |
| 5,530,345 A | * | 6/1996 | Murari et al. ............. | 324/207.2 |
| 5,594,335 A | * | 1/1997 | Melbert ..................... | 324/207.2 |
| 6,175,296 B1 | * | 1/2001 | Tokunaga et al. ......... | 338/32 R |
| 6,720,761 B1 | * | 4/2004 | Doi et al. ................. | 324/207.2 |

FOREIGN PATENT DOCUMENTS

| | | |
|---|---|---|
| JP | 63-305783 A | 12/1988 |
| JP | 2-174547 A | 7/1990 |
| JP | 2001-33277 A | 2/2001 |

* cited by examiner

*Primary Examiner*—Jay Patidar
(74) *Attorney, Agent, or Firm*—Sughrue Mion, PLLC

(57) ABSTRACT

A rotating angle detector (10) according to the invention comprises magnetic field generating means for rotating integrally with a detected member and uniformly generating a magnetic field in one direction perpendicularly to a rotating axis in a stationary state, and at least two magnetic sensors (41), (42), (43) and (44) provided to generate one sine wave for one rotation of the magnetic field generating means respectively, wherein input current terminals (61), (62), (63) and (64) of the magnetic sensor are connected in series.

Moreover, it is also possible to employ such a structure that at least two signal differential amplifying means are arranged on a substrate provided with at least two magnetic sensors and there is provided a circuit wiring for causing an output sent from each of the magnetic sensors to pass through the signal differential amplifying means. Furthermore, it is also possible to employ such a structure that all the input current terminals of the magnetic sensor of an apparatus provided with a plurality of rotating angle detectors are connected in series.

4 Claims, 5 Drawing Sheets

ROTATING ANGLE DETECTOR AND APPARATUS THEREOF FOR DETECTING THE ROTATING POSITION OF A ROTOR

This is a continuation of International Application No. PCT/JP02/01167 filed Feb. 12, 2002; the disclosure of which is incorporated herein by reference.

TECHNICAL FIELD

The present invention relates to a rotating angle detector for detecting the rotating position of a rotor and an apparatus thereof.

BACKGROUND ART

Conventionally, there has been a rotating angle detector for detecting the rotating position of a rotor as shown in FIG. 4. FIG. 4 is a perspective view showing the structure of the rotating angle detector. In FIG. 4, 1 denotes a rotor, 2 denotes a permanent magnet, 3 denotes a stator, and 4 denotes a magnetic sensor. The permanent magnet 2 is fixed to the rotor 1 and the magnetic sensor 4 is provided on the stator 3 in a peripheral portion thereof to be opposed to the permanent magnet 2 through a gap. The permanent magnet 2 is magnetized in one direction perpendicularly to an axial direction as shown in an arrow by using a linear magnetic anisotropic magnet. The magnetic sensor 4 is provided in such a manner that each difference in mechanical phase angle is set to be 90 degrees. As a result, it is possible to obtain a sine wave and a cosine wave every rotation of the rotor 1. In the case in which the differential signals of the sine wave and the cosine wave are required, four magnetic sensors 41, 42, 43, and 44 are provided around the permanent magnet 2 to carry out a detection.

Referring to the detecting method of the magnetic sensor, description will be given to an example in which a hall unit is used. FIG. 5 is an explanatory view showing the detection principle of the magnetic one. The hall sensor is formed by a compound semiconductor such as GaAs, InSb or InAs, and output terminals 5a and 5b and input current terminals 6a and 6b are attached to a magnetic sensing section having a thickness d. An input current $I_C$ is caused to flow to the input current terminals 6a and 6b so that a potential difference $V_H$ between the output terminals 5a and 5b is changed corresponding to a variation of magnetic flux B in magnetic sensors. In the structure shown in FIG. 4, four magnetic sensors are provided. Therefore, a wiring shown in FIG. 6 is obtained. FIG. 6 is a typical diagram showing the wiring in the structure of FIG. 4. In FIG. 6, 51 denotes a magnetic sensor terminal, 61 denotes an input current terminal and 10 denotes a rotation detector. Four wirings are required for each magnetic sensor and 16 signal lines in total are connected. A rotating angle can be detected by calculating a signal sent from the magnetic sensor by means of an angle calculator which is not shown. Referring to a calculating method, a rotating angle θ can be calculated as θ=arctan (Va/Vb), wherein a differential voltage output of two outputs having a diagonal relationship in the four magnetic sensor outputs is represented by Va and a differential voltage output of other magnetic sensors is represented by Vb, for example.

In the conventional art, however, 16 signal lines are required for a rotation detector unit. In the case in which a plurality of rotating angle detectors such as articulated robots are used at the same time or are small-sized, particularly, a friction in a motion is caused so that there is a problem in that a working efficiency is reduced.

DISCLOSURE OF THE INVENTION

Therefore, it is an object of the invention to provide a small-sized rotating angle detector which can have a high productivity by devising the wiring of an input current terminal and mounting an operational amplifier, and an apparatus thereof.

In order to attain the object, the invention provides a rotating angle detector comprising magnetic field generating means for rotating integrally with a detected member and uniformly generating a magnetic field in one direction perpendicularly to a rotating axis in a stationary state, and at least two magnetic sensors provided to generate one sine wave for one rotation of the magnetic field generating means respectively, wherein an input current terminal of the magnetic sensor is connected in series.

Moreover, at least two signal differential amplifying means may be arranged on a substrate provided with the magnetic sensor and there may be provided a circuit wiring in which an output sent from each of the magnetic sensors passes through the signal differential amplifying means.

Furthermore, in a rotating angle detecting apparatus provided with a plurality of rotating angle detectors comprising magnetic field generating means for rotating integrally with a detected member and uniformly generating a magnetic field in one direction perpendicularly to a rotating axis in a stationary state, and at least two magnetic sensors provided to generate one sine wave for one rotation of the magnetic field generating means respectively, all input current terminals of the magnetic sensor are connected in series.

In addition, there may be provided a waveform processing apparatus for converting a signal obtained from the magnetic sensor into angular information and positional information.

As described above, according to the invention, the input current path of the magnetic sensor is connected in series, and furthermore, the output signal is differentially amplified and synthesized. Consequently, there can be produced an advantage that the number of the wirings of the rotating angle detector can be decreased considerably, and at the same time, it is possible to obtain a rotating angle detector capable of having a high efficient workability also in the case in which a plurality of rotating angle detectors are used or are small-sized.

BEST MODE OF CARRYING OUT THE INVENTION

Embodiments of the invention will be described below in detail with reference to the drawings.

(First Embodiment)

Figure 1:
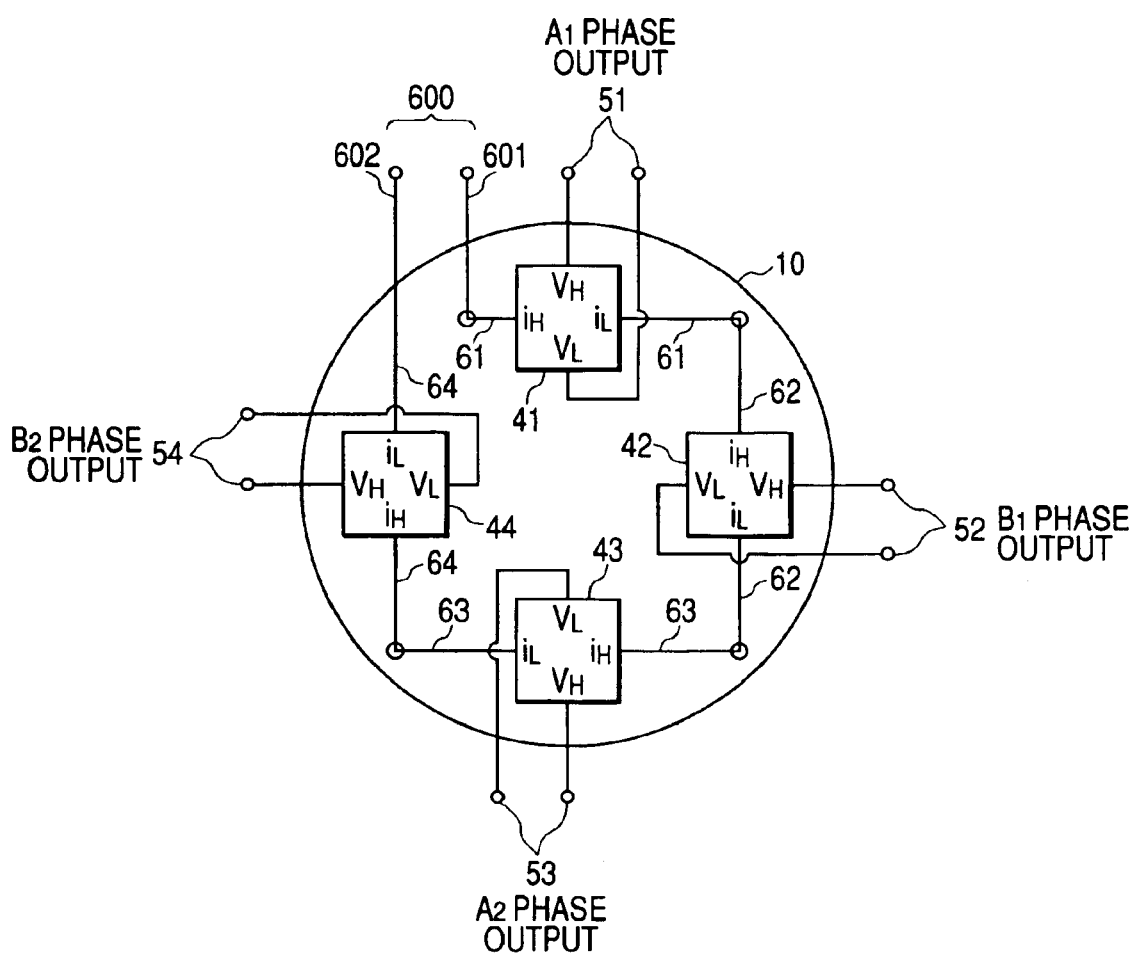
FIG. 1 is a wiring diagram showing a magnetic sensor according to a first embodiment of the invention.
Figure 4:
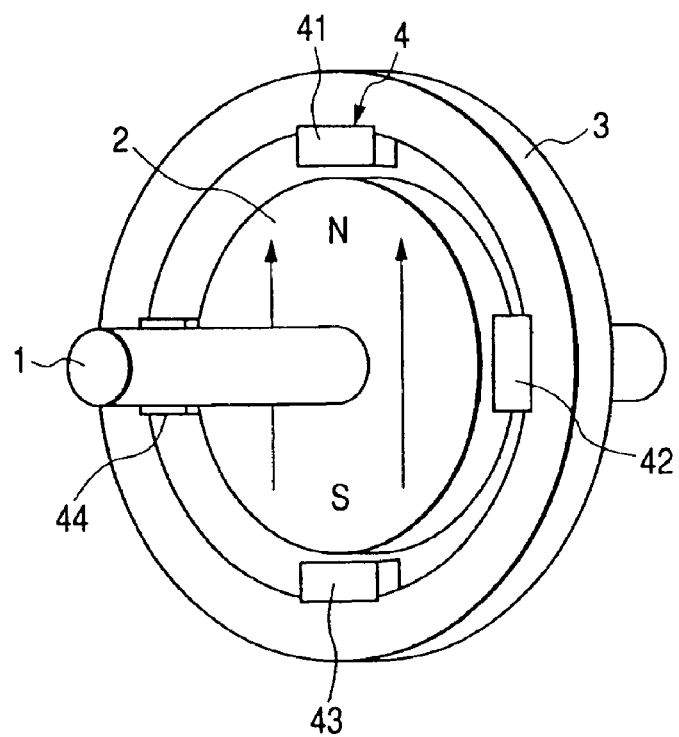
FIG. 4 is a perspective view showing a rotating angle detector.
Figure 5:
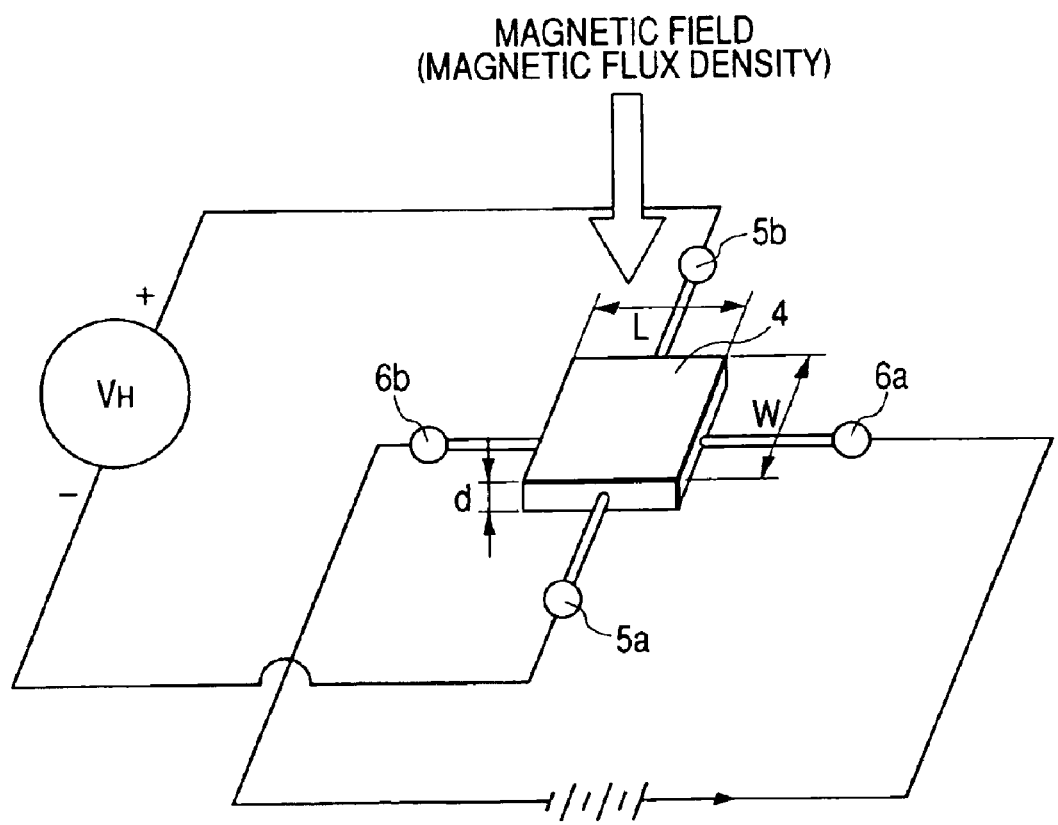
FIG. 5 is a perspective view showing the detection principle of the magnetic sensor.
Figure 6:
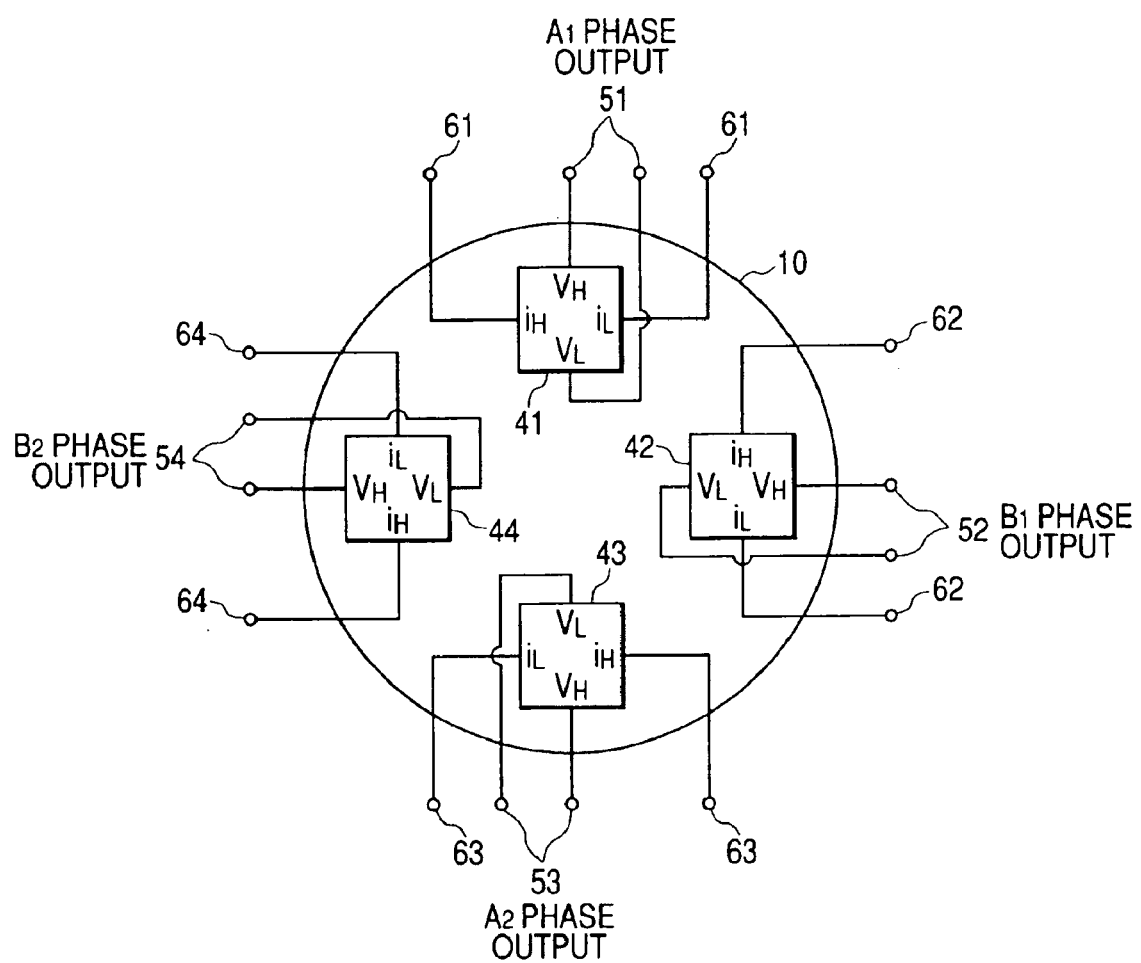
FIG. 6 is a wiring diagram showing a conventional magnetic sensor.

FIG. 1 is a wiring diagram showing a magnetic sensor according to a first embodiment of the invention. A whole structure according to the embodiment is the same as that in FIG. 4. In FIG. 1, 41, 42, 43 and 44 denote a magnetic sensor, 51, 52, 53 and 54 denote a magnetic field detecting terminal of the magnetic sensor, 61, 62, 63 and 64 denote an input current terminal of the magnetic sensor, 601 and 602 denote an input current path, and 10 denotes a rotating angle detector.

Each magnetic sensor uses a hall element. When an input current is caused to flow between $i_H$ and $i_L$ terminals of each hall element, a voltage is generated between $V_H$ and $V_L$ terminals according to the intensity of an external magnetic field. Therefore, the $i_L$ terminal of the input current terminal 61 of the magnetic sensor 41 and the $i_H$ terminal of the input current terminal 62 of the magnetic sensor 42, the $i_L$ terminal of the input current terminal 62 and the $i_H$ terminal of the input current terminal 63, and the $i_L$ terminal of the input current terminal 63 and the $i_H$ terminal of the input current terminal 64 are connected, respectively. The $i_H$ terminal of the input current terminal 61 is connected to the input current path 601 and the $i_L$ terminal of the input current terminal 64 is connected to the input current path 602. A plurality of hall elements have input current terminals connected in series.

Thus, the total number of wirings required for the rotating angle detector 10 is ten, that is, the number of the input current terminals is two and the number of the $V_H$ and $V_L$ terminals of each magnetic sensor is eight, which is much smaller than sixteen in the conventional art.

(Second Embodiment)

Figure 2:
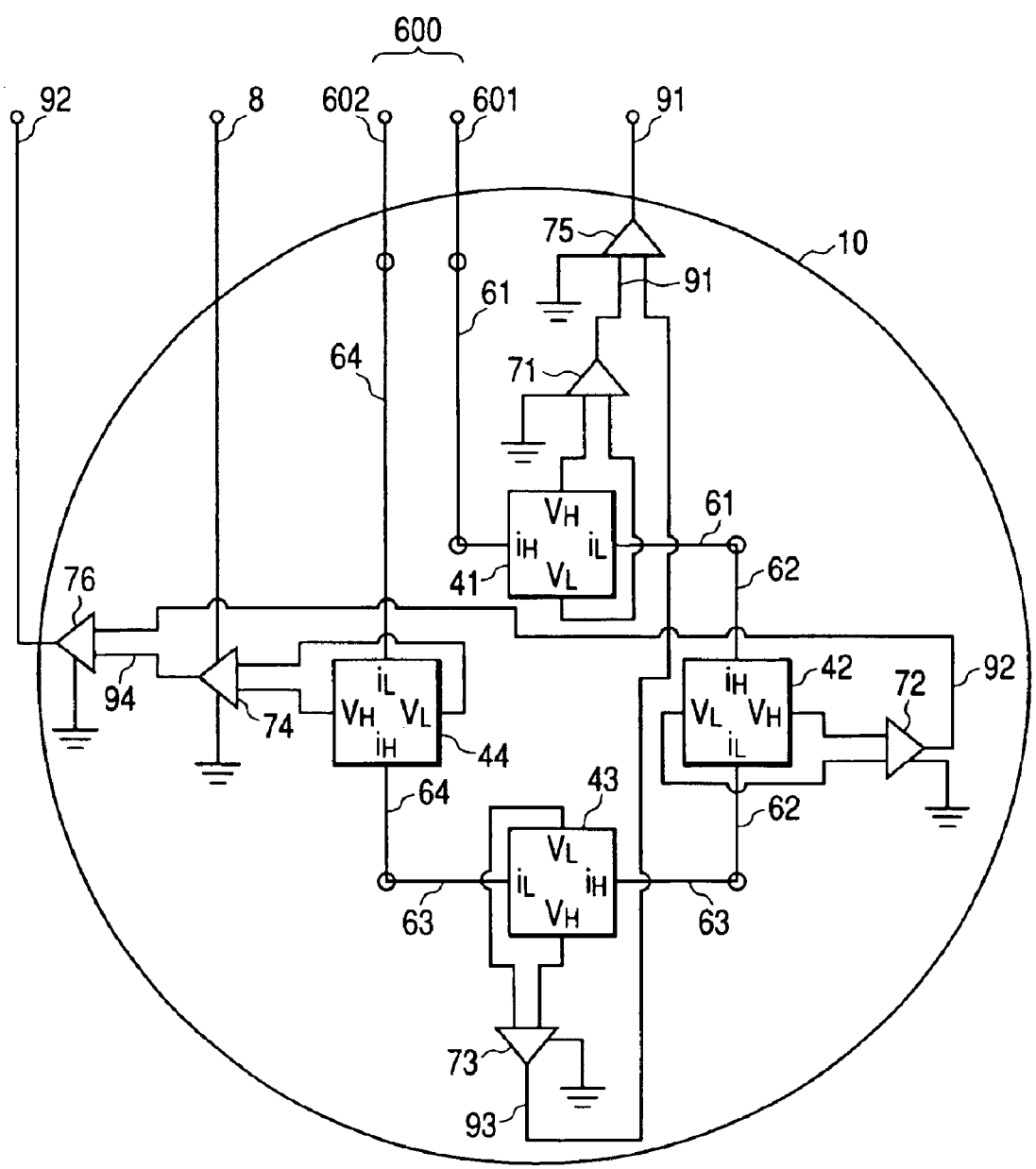
FIG. 2 is a wiring diagram showing a magnetic sensor according to a second embodiment of the invention.

FIG. 2 is a wiring diagram showing a magnetic sensor according to a second embodiment of the invention. In FIG. 2, 601 and 602 denote an input current path, 71, 72, 73, 74, 75 and 76 denote signal differential amplifying means (hereinafter referred to as an operational amplifier), 8 denotes a ground line, 91 and 92 denote a final output of the operational amplifier, and 10 denotes a rotating angle detector. In the same manner as in the first embodiment, an $i_H$ terminal of an input current terminal 61 is connected to the input current path 601 and an $i_L$ terminal of an input current terminal 64 is connected to the input current path 602.

Description will be given to an operating method in which six operational amplifiers are provided. The operational amplifiers 71, 72, 73, 74, 75 and 76 are provided on the same substrate as magnetic sensors 41, 42, 43 and 44, and the signals of the output terminals $V_H$ and $V_L$ of each magnetic sensor are differentially amplified by using the operational amplifiers 71, 72, 73 and 74.

In the case in which an angle (a position) with high precision is to be detected, furthermore, an in phase noise and a harmonic distortion in detected signals adversely effect the precision in the angle (the position). In order to remove the in phase noise and the harmonic distortion, therefore, the output 91 having an $A_1$ phase and an output 93 having an $A_2$ phase are further amplified differentially to be the final output 91 by using the operational amplifiers 75 and 76, and the $B_1$-phase output 92 and a $B_2$-phase output 94 are differentially amplified. By such a structure, the number of signal lines sent from the rotating angle detector 10 can be decreased from sixteen in the conventional art to five. Thus, the wiring can be more saved than that in the first embodiment.

(Third Embodiment)

Figure 3:
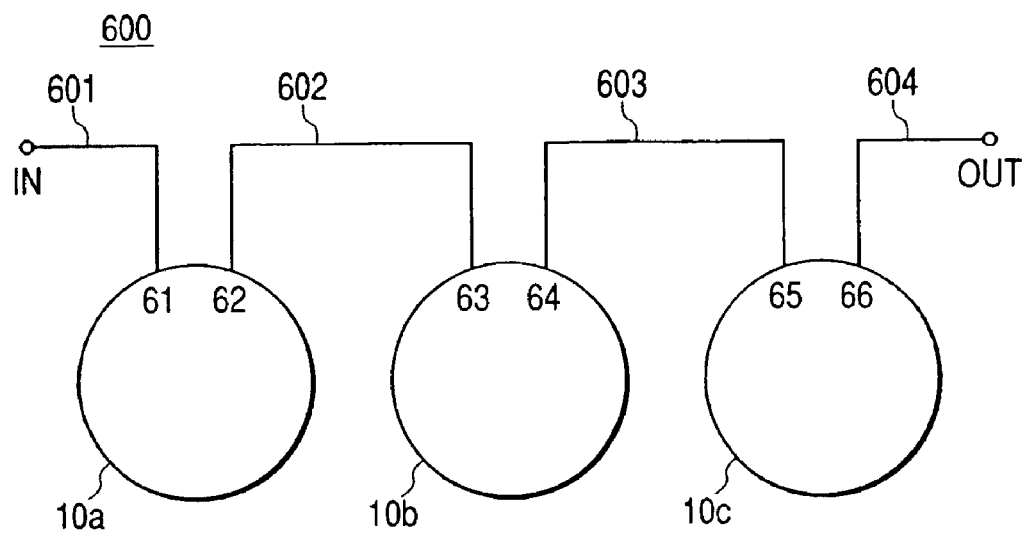
FIG. 3 is a wiring diagram showing a magnetic sensor according to a third embodiment of the invention.

FIG. 3 is a wiring diagram showing a magnetic sensor according to a third embodiment of the invention. In FIG. 3, 61 to 66 denote an input current terminal of a magnetic sensor of each rotating angle detector 10, 601 to 604 denote an input current path for connecting the input current terminals, and 10a, 10b and 10c denote a rotating angle detector.

There are provided magnetic field generating means, a magnetic sensor and a bearing for supporting the magnetic field generating means which are not shown. An $i_H$ terminal of the input current terminal of each rotation detector is represented as 61, 63 and 65, and an $i_L$ terminal is represented as 62, 64 and 66. The $i_L$ terminals and the $i_L$ terminals, for example, 62 and 63, and 64 and 65 are connected to each other. Consequently, a plurality of rotating angle detectors can be connected in series.

In some cases in which constant voltage driving is carried out, the value of a current flowing to each rotation detector is changed. In these cases, it is also possible to supply a predetermined current value to each detector by using a constant current circuit.

As a result, two wirings for an input current can also be provided in a rotating angle detecting apparatus having a plurality of rotating angle detectors.

While the description has been given by using the hall element as the magnetic sensor, moreover, it is also possible to obtain the same advantages by using a magnetoreluctance effect element. Therefore, the invention includes the case in which the magneto-reluctance effect element is used as the magnetic sensor.

Furthermore, the rotating angle detector may be provided with a waveform processing apparatus for converting a signal obtained from the magnetic sensor into angular information and positional information.

Industrial Applicability

As described above, according to the invention, the input current path of a magnetic sensor is connected in series, and furthermore, an output signal is differentially amplified and synthesized. Therefore, there can be produced an advantage that the number of the wirings of the rotating angle detector can be decreased considerably, and at the same time, it is possible to obtain a rotating angle detector capable of having a high efficient workability also in the case in which a plurality of rotating angle detectors are used or are small-sized.

What is claimed is:

1. A rotating angle detector comprising:
   magnetic field generator that uniformly generates a magnetic field in a direction perpendicularly to a rotating axis, and
   at least four magnetic sensors provided to generate one sine wave each for one rotation of the magnetic field generator, and
   a substrate provided with at least four differential amplifying means for amplifying detection signals respectively originating from the at least four magnetic sensors,
   wherein, current terminals of the at least four magnetic sensors are connected to each other in a form of a series connection
   wherein the substrate further includes:
   at least two signal differential amplifiers that receive the outputs from the at least four differential amplifiers.

2. The rotating angle detector of claim 1, wherein at least one magnetic sensor is a Hall sensor.

3. The rotating angle detector of claim 1, wherein at least one magnetic sensor is a magneto-reluctance sensor.

4. A rotating angle apparatus comprising a plurality of rotating angle detectors, at least one of said rotating angle detectors including:

at least four magnetic sensors provided to generate one sine wave each for one rotation of a magnetic field generator that uniformly generates a magnetic field in a direction perpendicularly to a rotating axis, wherein, current terminals of the at least four magnetic sensors are connected to each other in a form of a series connection, and a substrate provided with at least four differential amplifying means for amplifying detection signals respectively originating from the at least four magnetic sensors, wherein the substrate further includes:

at least two signal differential amplifiers that receive the outputs from the at least four differential amplifiers.

* * * * *